(12) United States Patent
Tortorelli

(10) Patent No.: US 7,384,992 B2
(45) Date of Patent: Jun. 10, 2008

(54) ROSIN-FATTY ACID ESTER VINYLIC POLYMERS

(75) Inventor: Louis Joseph Tortorelli, Goose Creek, SC (US)

(73) Assignee: MeadWestvaco Corporation, Glen Allen, VA (US)

( * ) Notice: Subject to any disclaimer, the term of this patent is extended or adjusted under 35 U.S.C. 154(b) by 631 days.

(21) Appl. No.: 10/948,176

(22) Filed: Sep. 24, 2004

(65) Prior Publication Data

US 2005/0101728 A1 May 12, 2005

Related U.S. Application Data

(60) Provisional application No. 60/518,733, filed on Nov. 10, 2003.

(51) Int. Cl.
*C09D 11/00* (2006.01)

(52) U.S. Cl. ................. 523/160; 523/161; 524/801; 524/804; 524/832; 524/833; 526/224; 526/227; 526/238.3; 526/318.4

(58) Field of Classification Search ........... 524/801, 524/804, 832, 833; 523/160, 161; 526/224, 526/227, 238.3, 318.4
See application file for complete search history.

(56) References Cited

U.S. PATENT DOCUMENTS

| | | | |
|---|---|---|---|
| 3,412,054 A | 11/1968 | Milligan et al. | |
| 3,480,578 A | 11/1969 | Witt | |
| 3,716,389 A | 2/1973 | Voskuil et al. | |
| 3,770,486 A | 11/1973 | Hopermann | |
| 4,116,903 A | 9/1978 | Lietz et al. | |
| 4,273,690 A | 6/1981 | Walus | |
| 4,317,755 A | 3/1982 | Gregory | |
| 4,414,370 A | 11/1983 | Hamielec et al. | |
| 4,459,129 A | 7/1984 | Gooding et al. | |
| 4,529,787 A | 7/1985 | Schmidt et al. | |
| 4,546,160 A | 10/1985 | Brand et al. | |
| 4,591,518 A | 5/1986 | Schillinger et al. | |
| 4,649,175 A | 3/1987 | Inoue et al. | |
| 4,812,508 A | 3/1989 | Makhlouf et al. | |
| 4,839,413 A | 6/1989 | Kiehlbauch et al. | |
| 5,008,329 A | 4/1991 | Abe et al. | |
| 5,096,959 A | 3/1992 | Jones et al. | |
| 5,116,945 A | 5/1992 | Osawa et al. | |
| 5,182,326 A | 1/1993 | LeBlanc et al. | |
| 5,216,064 A | 6/1993 | Rivera et al. | |
| 5,336,438 A | 8/1994 | Schilling et al. | |
| 5,370,939 A | 12/1994 | Williams et al. | |
| 5,596,032 A | 1/1997 | Schilling et al. | |
| 5,656,679 A | 8/1997 | Hutter | |
| 5,965,647 A | 10/1999 | Catena et al. | |
| 6,172,149 B1 | 1/2001 | Shah et al. | |
| 6,329,068 B1 | 12/2001 | Shah et al. | |
| 6,429,247 B1 | 8/2002 | Shah et al. | |
| 6,433,052 B1 | 8/2002 | Shah et al. | |
| 6,437,033 B1 | 8/2002 | Shah et al. | |
| 6,503,971 B1 | 1/2003 | Shah et al. | |

FOREIGN PATENT DOCUMENTS

| | | |
|---|---|---|
| EP | 0017199 | 10/1980 |
| EP | 0341956 | 11/1989 |
| GB | 1048060 | 11/1966 |

*Primary Examiner*—Edward J Cain
(74) *Attorney, Agent, or Firm*—Terry B. McDaniel; Warunee Srisiri

(57) ABSTRACT

This invention relates to novel rosin-alkyl ester of unsaturated fatty acid vinylic polymer and emulsion compositions and the processes for preparing them. In particular, the invention relates to novel rosin-alkyl ester of unsaturated fatty acid vinylic polymer and emulsion compositions which the polymer exhibit properties that make them useful as support resins for industrial coatings, ink and overprint formulations and as additives for formulating various coating compositions; and the emulsion which exhibits properties that make them useful as water-borne vehicles for coatings on various substrates.

42 Claims, No Drawings

ROSIN-FATTY ACID ESTER VINYLIC POLYMERS

This non-provisional application relies on the disclosure of (and claims the benefit of the filing date of) provisional application Ser. No. 60/518,733, filed on Nov. 10, 2003.

FIELD OF INVENTION

This invention relates to novel rosin-fatty acid ester vinylic polymer compositions and processes for preparing the same. In particular, the invention relates to rosin-alkyl ester of unsaturated fatty acid vinylic polymer compositions that are suitable for use as support resins in emulsion compositions which exhibit properties that make them useful as water-borne vehicles for coatings on various substrates.

BACKGROUND OF THE INVENTION

Polymeric resins are commonly employed in a variety of different uses. For example, polymeric resins may be employed as support resins for waterborne emulsions. Typical surfactant-based emulsion polymerization products generally do not have the rheology properties desired for graphic arts and industrial coatings applications (i.e. film build, flow and leveling, and stability). It is, therefore, a common practice to add to the emulsion polymerization a low molecular weight water-soluble or alkaline-soluble polymer (also referred to in the art as a resin) in place of, or in addition to, a surfactant in order to improve the stability and rheology properties of the emulsion. Such improved stability generally results from adsorption of the resin on the surface of the polymer particles.

Supported emulsions are commonly employed in paints, clear coatings, floor finishes, leather treatments, cement formulations, functional paper coatings, and graphic art applications. The latter encompasses pigmented (ink) and non-pigmented (overprints and functional coatings) formulations. A support emulsion is comprised of two polymers, one that represents the support resin and a second polymer that is dispersed into the support. The second polymer may be dispersed through agitation or actually be polymerized in the presence of the support resin. Supported emulsions add stability while enhancing the flow characteristics of the formulation (thereby resulting in higher gloss and clarity).

Traditional processes for producing polymer support resins are well known (see generally U.S. Pat. Nos. 4,839,413 and 5,216,064, which are hereby incorporated by reference). Commonly a solution polymerization reaction is employed wherein styrenic monomer and acrylic acid is mixed with a hydrocarbon solvent, a polymerization initiator, and a chain transfer agent. Upon completion of the reaction, the solution is stripped of the solvent to yield the acrylic polymer. The polymer is then available for use as a support resin when dissolved in an alkaline water solution. However, major problems exist with such traditional methods of producing support resins. For example, these methods require the use of environmentally adverse hydrocarbon solvents. Moreover, as these solvents are not usable or desirable in water-based coatings, inks or overprint formulations, the solvents must be stripped from the resulting acrylic polymers (thereby causing a yield loss). This stripping step also adds expense to the process due to both the loss of yield and the energy consumed in performing the stripping. Also, these methods must utilize chain transfer agents to regulate the molecular weight of the resulting support resin.

A number of these problems were addressed via the development of rosin-fatty acid vinylic polymer compositions suitable for employment as support resins in emulsion compositions for coating formulations (see generally U.S. Pat. Nos. 6,429,247 and 6,437,033 B1 which are hereby incorporated by reference). However, it was found that some coatings formulated with these support resins tended to exhibit a decreased adhesion and chemical resistance when used on certain substrates, particularly certain metals and alkyd coatings.

Although water-based coatings and inks are comprised of various components, the emulsion polymer is principally responsible for adhesion to the substrate. Adhesion is a quantitative description of the work of detachment between two phases under conditions of failure.

In the present invention, rosin-fatty acid ester vinylic polymer compositions used as support resins for emulsion polymerization are produced preferably in bulk condition, thereby eliminating the costly stripping process for resin production. In addition, the resin polymerization can be performed at a higher temperature than traditional solution polymerization reactions. Moreover, as the present invention employs a lower amount of free radical initiator and little or no chain transfer agent, the resulting resins can be produced at a reduced cost (and unpleasant odors commonly associated with chain transfer agents can be avoided).

Alkyds generally are formed by the esterification polymerization of polyols and polybasic acid. The reaction mixture may also include monobasic acids, fatty acids and the like.

Due to their desired physical properties and low material costs, solvent-based alkyds have long been widely used as ingredients in coating compositions for various materials. For example, films resulting from aqueous alkyd coating compositions may be used as protective coatings for farm equipment and as a finish or refinish for trucks and automobiles. They are also extensively employed in architectural varnishes and enamels which require high gloss. However, rising health and environmentally concerns over the emission of organic compounds from solvent-based paints have resulted in strict regulation of the amount of volatile organic compounds (VOC) emitted from applied paints. In addition, rapid advances in technical innovation require improvements in the properties of coatings compositions. For example, it is desired that pigments be dispersed more effectively with higher stability in order to produce coating finishes having improved gloss (i.e., gloss at 60°) and distinctiveness-of-image gloss (i.e., gloss at 20°). Moreover, these coatings often exhibit problems with adhesion, flexibility, and resistance to corrosion and chemicals.

In an attempt to comply with the challenges of increased regulation and improved performance, industry has devoted much effort toward developing water-borne and high solid alkyds coatings which employ far lower amounts of organic solvents than conventional coatings. In spite of these substantial efforts, a need exists in the industry for such improved water-borne alkyds and high solid alkyds coatings.

High solid alkyds which employ less organic solvent than conventional alkyds often suffer from a dramatic increase in viscosity as the amount of solvent employed decreases. It has often been necessary for a high solid system to use lower molecular weight resins in order to maintain a workable paint viscosity. However, such systems tend not to develop the same hardness and through-dry in thick films in the same amount of time when compared to systems using higher molecular weight materials. Moreover, the additional functionality (which may build up the coating molecular weight after application) usually required for such high solid systems commonly results in adverse performance and higher production costs. One example of the use of additional functionality is to increase the level of unsaturated fatty acid to ensure sufficient crosslinking to achieve acceptable coating properties. One of the major drawbacks in the use of such high solid alkyds is the development of severe yellowing in the cured coatings due to the increased level of unsaturated fatty acid. U.S. Pat. No. 5,370,939 references attempts to address this yellowing problem in alkyd coatings by via the incorporation of polyhydroxy based allyl ethers into alkyds to replace a part of, or all of, the fatty acid. In U.S. Pat. No. 4,591,518, alkyd resins containing pendant polymerizable unsaturated groups attached to the alkyd through urethane linkages are claimed to improve high solid performance.

Water-borne alkyds coatings which use water as a dispersing medium are mainly emulsions and water-dispersible resins. Although showing an impressive success in replacing organic solvent coatings in many applications, water-borne alkyd coatings have not been able to satisfy the need of the coating industry in many applications because of certain inherent problems (e.g., insufficient gloss, water sensitivity, hydrolytic stability, and the difficulty of controlling water evaporation after application).

Coating compositions of acrylic polymers commonly provide finishes with excellent appearance, weatherability and durability. Coatings compositions of alkyds are known for their excellent gloss and their ability to be cured at ambient temperature. However, such alkyd coating compositions are also known for their inferior weatherability and durability when compared to acrylic finishes. Tremendous efforts have, therefore, been concentrated on developing interpolymers which are the combination of acrylic polymer and alkyd polymer.

Simply blending acrylic polymers and alkyds does not provide an optimum finish, as these acrylic polymer and alkyds are generally not compatible.

In the art of emulsions utilizing alkyd resins, interpolymer emulsions of acrylic polymers and alkyds have been prepared typically by following either one of two different procedures. In one procedure, an alkyd resin and compatible vinyl emulsion are separately formed, and then admixed together. By the other procedure, vinylic monomers are in situ polymerized in the presence of a preformed solution or dispersion of alkyd resin so as to provide an interpolymer system. The in-situ polymerization can take place with or without a conventional emulsifier. An example of this is U.S. Pat. No. 4,116,903, where a neutralized, aqueous solution of alkyd resin is utilized as sloe emulsifier to stabilize the in-situ vinylic emulsion polymerization.

In U.S. Pat. No. 4,273,690, an interpolymer is produced by grafting alkyd resin to the acrylic polymer backbone through urethane moiety. A number of patents have described the production of water-borne alkyds via the use polyurethane dispersion (see U.S. Pat. No. 3,412,054 and European Patent Application No. EP 0017199A1). Polyurethane dispersions or isocyanate compounds (which are the precursor for urethane moiety) are quite costly, and result in much higher production costs for water-borne alkyds when compared to conventional solventborne alkyds.

The water-borne alkyds often exhibit poor hydrolytic stability, in that they often do not have the capability to withstand storage for long periods of time at the high storage temperatures often found in warehousing and manufacturing facilities. Hydrolysis of alkyds may result in the separation of the coatings composition into phrases, accompanied by the settling of solid materials to the bottom or substantial reductions in viscosity and the diminished performance of the coating materials. U.S. Pat. No. 5,096,959, attempts to improve the hydrolytic stability of water-borne alkyds by reacting the base alkyd commonly used for such compositions with a polybasic acid composition comprising one or more cycloaliphatic polycarboxylic acids. However, this approach requires the use of costly cycloaliphatic polycarboxylic acids, thereby increasing production costs.

An attempt to improve the adhesion property of water-borne alkyds is disclosed in U.S. Pat. No. 4,649,175, which teaches the incorporation of nitrogen-containing compounds into the alkyds. This incorporation, however, increases the cost of production of such water-borne alkyds.

Therefore, an object of this invention is to solve these major problems by disclosing rosin-fatty acid ester vinylic polymer compositions.

Another objective is to disclose rosin-fatty acid ester vinylic polymer emulsion compositions.

A further objective is to disclose rosin-fatty acid ester vinylic polymer compositions which exhibit properties that make them useful as support resins in water-based emulsions.

Another objective is to disclose rosin-fatty acid ester vinylic polymer emulsion compositions which exhibit properties that make them useful in formulating water-based inks, overprint, and other coating formulations.

SUMMARY OF THE INVENTION

The objects of this invention are met via a method that employs rosin and fatty acid ester to act as solvents in the polymerization reaction of the acrylic monomers, thereby producing rosin-fatty acid ester vinylic polymer compositions suitable for use as support resins in waterborne emulsions. As this method does not require the use of hydrocarbon solvents, the need for solvent stripping is eliminated. Also, the polymerization reaction can be conducted at higher temperatures than traditional solution polymer methods, thereby allowing the practitioner to utilize smaller amounts of free radical initiators. Furthermore, the practitioner is able to regulate molecular weight without the use of chain transfer agents, thereby both reducing costs and avoiding the production of unpleasant odors associated with such agents. Moreover, the fatty acid ester and rosin can function as a reactive diluent to impart flexibility to the support resin. The rosin-fatty acid ester vinylic polymer compositions have enhanced properties (such as adhesion, flexibility, and stain resistance) which make the compositions highly desirable for a number of uses, including the formulation of overprint varnishes for coatings on paper and cellulose-based materials, the formulation of architectural and industrial paints for coating wood, plastic and metal substrates, and the formulation of ink vehicles for coating film and foil substrates. Coatings formulated with the rosin-fatty acid ester vinylic polymer compositions exhibit excellent adhesion properties to various substrates, improved chemical resistance, and outstanding appearance such as gloss (60°) and distinctiveness-of-image gloss (gloss at 20°) comparable to or better than those of solventborne alkyds.

DESCRIPTION OF THE PREFERRED EMBODIMENT

The rosin-fatty acid ester vinylic polymer compositions of the present invention comprise the reaction products produced by reacting in a resin addition polymerization reaction:
(1) about 15.0% to about 60.0% by total weight of the reactants of a fatty acid ester rosin mixture comprising:
  (a) about 10.0% to about 90.0% by total weight of the fatty acid ester rosin mixture of at least one alkyl ester of unsaturated fatty acid, and
  (b) about 10.0% to about 90.0% by total weight of the fatty acid ester rosin mixture of rosin; and
(2) about 40.0% to about 85.0% by total weight of the reactants of a monomer mixture comprising:
  (a) about 15.0% to about 55.0% by total weight of the monomer mixture of a member selected from the group consisting of acrylic acid, methacrylic acid, fumaric acid, maleic anhydride, and combinations thereof,
  (b) about 45.0% to about 85.0% by total weight of the monomer mixture of a member selected from the group consisting of non-carboxylic acid containing vinylic monomers and combinations thereof,
  (c) a catalytic amount of polymerization initiator,
  (d) up to about 4.0% by total weight of the monomer mixture of chain transfer agent, and
  (e) up to about 30.0% by total weight of the monomer mixture of hydrocarbon solvent, at a temperature in the range of about 135° C. to about 200° C. to produce rosin-fatty acid ester vinylic polymer compositions having a weight average molecular weight in the range of about 4,000 to about 12,000.

Preferred rosin-fatty acid ester vinylic polymer compositions of the present invention comprise the reaction products produced by reacting in a resin addition polymerization reaction:
(1) about 20.0% to about 60.0% by total weight of the reactants of a fatty acid ester rosin mixture comprising:
  (a) about 55.0% to about 85.0% by total weight of the fatty acid ester rosin mixture of at least one alkyl ester of unsaturated fatty acid, and
  (b) about 15.0% to about 40.0% by total weight of the fatty acid ester rosin mixture of rosin; and
(2) about 40.0% to about 80.0% by total weight of the reactants of a monomer mixture comprising:
  (a) about 33.5% to about 50.0% by total weight of the monomer mixture of a member selected from the group consisting of acrylic acid, methacrylic acid, fumaric acid, maleic anhydride, and combinations thereof,
  (b) about 50.0% to about 65.0% by total weight of the monomer mixture of a member selected from the group consisting of non-carboxylic acid containing vinylic monomers and combinations thereof,
  (c) a catalytic amount of polymerization initiator,
  (d) about 0.5% to about 2.0% by total weight of the monomer mixture of chain transfer agent, and
  (e) up to about 4.0% by total weight of the monomer mixture of hydrocarbon solvent, at a temperature in the range of about 135° C. to about 200° C. to produce rosin-fatty acid ester vinylic polymer compositions having a weight average molecular weight in the range of about 4,000 to about 12,000.

The rosin-fatty acid ester vinylic polymer emulsion compositions of the present invention comprise the reaction products produced by:
(A) reacting in a resin addition polymerization reaction:
  (1) about 15.0% to about 60.0% by total weight of the reactants of a fatty acid ester rosin mixture comprising:
    (a) about 10.0% to about 90.0% by total weight of the fatty acid ester rosin mixture of at least one alkyl ester of unsaturated fatty acid, and
    (b) about 10.0% to about 90.0% by total weight of the fatty acid ester rosin mixture of rosin; and
  (2) about 40.0% to about 85.0% by total weight of the reactants of a monomer mixture comprising:
    (a) about 15.0% to about 55.0% by total weight of the monomer mixture of a member selected from the group consisting of acrylic acid, methacrylic acid, fumaric acid, maleic anhydride, and combinations thereof,
    (b) about 45.0% to about 85.0% by total weight of the monomer mixture of a member selected from the group consisting of non-carboxylic acid containing vinylic monomers and combinations thereof,
    (c) a catalytic amount of polymerization initiator,
    (d) up to about 4.0% by total weight of the monomer mixture of chain transfer agent, and
    (e) up to about 30.0% by total weight of the monomer mixture of hydrocarbon solvent, at a temperature in the range of about 135° C. to about 200° C. to produce rosin-fatty acid ester vinylic polymers having a weight average molecular weight in the range of about 4,000 to about 12,000; and (B) further reacting in an emulsion polymerization reaction a mixture of:
  (1) about 5.0% to about 90.0% by total weight of the mixture of the rosin-fatty acid ester vinylic polymers of step A,
  (2) about 10.0% to about 95.0% by total weight of the mixture of a member selected from the group consisting of vinylic monomers and combinations thereof,
  (3) a catalytic amount of polymerization initiator,
  (4) up to about 4.0% by total weight of the mixture of chain transfer agent,
  (5) up to about 4.0% by total weight of the mixture of surfactant, and
  (6) the balance of the mixture being water, at a temperature in the range of about 20° C. to less than 100° C. to produce rosin-fatty acid ester vinylic polymer emulsion compositions having a weight average molecular weight in the range of about 40,000 to about 200,000.

Preferred rosin-fatty acid ester vinylic polymer emulsion compositions of the present invention comprise the reaction products produced by:
(A) reacting in a resin addition polymerization reaction:
  (1) about 20.0% to about 60.0% by total weight of the reactants of a fatty acid ester rosin mixture comprising:
    (a) about 55.0% to about 85.0% by total weight of the fatty acid ester rosin mixture of at least one alkyl ester of unsaturated fatty acid, and
    (b) about 15.0% to about 40.0% by total weight of the fatty acid ester rosin mixture of rosin; and
  (2) about 40.0% to about 85.0% by total weight of the reactants of a monomer mixture comprising:
    (a) about 33.5% to about 50.0% by total weight of the monomer mixture of a member selected from the group consisting of acrylic acid, methacrylic acid, fumaric acid, maleic anhydride, and combinations thereof,
(b) about 50.0% to about 65.0% by total weight of the monomer mixture of a member selected from the group consisting of non-carboxylic acid containing vinylic monomers and combinations thereof,
(c) a catalytic amount of polymerization initiator,
(d) about 0.5% to about 2.0% by total weight of the monomer mixture of chain transfer agent, and
(e) up to about 1.0% by total weight of the monomer mixture of hydrocarbon solvent, at a temperature in the range of about 135° C. to about 200° C. to produce rosin-fatty acid ester vinylic polymers having a weight average molecular weight in the range of about 4,000 to about 12,000; and (B) further reacting in an emulsion polymerization reaction a mixture of:
(1) about 10.0% to about 50.0% by total weight of the mixture of the rosin-fatty acid ester vinylic polymers of step A,
(2) about 20.0% to about 50.0% by total weight of the mixture of a member selected from the group consisting of vinylic monomers and combinations thereof,
(3) a catalytic amount of polymerization initiator,
(4) up to about 4.0% by total weight of the mixture of chain transfer agent,
(5) up to about 4.0% by total weight of the mixture of surfactant, and
(6) the balance of the mixture being water, at a temperature in the range of about 20° C. to less than 100° C. to produce rosin-fatty acid ester vinylic polymer emulsion compositions having a weight average molecular weight in the range of about 40,000 to about 200,000.

From about 10.0% to about 90.0% by total weight of the fatty acid ester rosin mixture employed in the resin addition polymerization reaction of the present invention consists of at least one alkyl ester of unsaturated fatty acid, with the preferred amount being from about 40.0% to about 85.0% by total weight of the fatty acid ester rosin mixture. Where desired, a combination of alkyl esters of unsaturated fatty acids may be utilized in the resin addition polymerization reaction to produce the rosin-fatty acid ester vinylic polymer compositions and rosin-fatty acid ester vinylic polymer emulsion compositions of the present invention.

Preferred alkyl esters of unsaturated fatty acids which are suitable for use in the present invention include those unsaturated fatty acids which contain a range of carbon atoms from about $C_{12}$ to about $C_{24}$, with the more preferred range being from about $C_{16}$ to about $C_{20}$. It is further preferred that the unsaturated fatty acid be vegetable or tall oil based. It is most preferred that the unsaturated fatty acid be tall oil based and contain from about 15% to about 18% conjugated double bonds. It is preferred that the alcohol portion of the alkyl ester of unsaturated fatty acids contain a range of carbon atoms from about $C_1$ to about $C_8$, with the more preferred range being $C_3$-$C_5$.

From about 10.0% to about 90.0% by total weight of the fatty acid ester rosin mixture employed in the resin addition polymerization reaction of the present invention consists of rosin, with the preferred amount being from about 15.0% to about 40.0% by total weight of the fatty acid ester rosin mixture. Where desired, a combination of rosins may be utilized in the resin addition polymerization reaction to produce the rosin-fatty acid ester vinylic polymer compositions and rosin-fatty acid ester vinylic polymer emulsion compositions of the present invention. Rosins which are suitable for use in the present method include wood rosin, tall oil rosin, gum rosin, and the like. The use of tall oil rosin is preferred.

From about 15.0% to about 55.0% by total weight of the monomer mixture employed in the resin addition polymerization reaction of the present invention consists of a member selected from the group consisting of acrylic acid, methacrylic acid, fumaric acid, maleic anhydride, and combinations thereof, with the preferred amount being in the range of about 33.5% to about 50.0% by total weight of the monomer mixture.

From about 45.0% to about 85.0% by total weight of the monomer mixture employed in the resin addition polymerization reaction of the present invention consists of at least one member selected from the group consisting of non-carboxylic acid containing vinylic monomers and combinations thereof, with the preferred amount being in the range of about 50.0% to about 65.0% by total weight of the monomer mixture.

Non-carboxylic acid containing vinylic monomers which are suitable for use in the resin addition polymerization reaction of the present invention include styrenic monomers, acrylic monomers, methacrylic monomers, ethylenic monomers, and the like. In the resin addition polymerization reaction, it is preferred that the vinylic monomers be a mixture, preferably including at least one monoalkenyl aromatic monomer and at least one acrylic monomer. Examples of suitable monoalkenyl aromatic monomers include, but are not limited to, the following: alpha-methyl styrene, styrene, vinyl toluene, tertiary butyl styrene, orthochlorostyrene, and mixtures thereof.

The term "acrylic monomer" as employed herein in reference to the non-carboxylic acid containing vinylic monomers employed in the resin addition polymerization reaction includes members of the group consisting of acrylic acid esters, methacrylic acid esters, derivatives of acrylic acid, derivatives of methacrylic acid, and combinations thereof. Examples of suitable acrylic and methacrylic ester monomers include the $C_1$-$C_{30}$ alkyl ester derivatives. Methacrylic esters suitable for use in the present invention include, but are not limited to, the following: methyl methacrylate, ethyl methacrylate, n-propyl methacrylate, n-butyl methacrylate, isopropyl methacrylate, isobutyl methacrylate, n-amyl methacrylate, n-hexyl methacrylate, isoamyl methacrylate, 2-hydroxyethyl methacrylate, 2-hydroxypropyl methacrylate, N,N-dimethylaminoethyl methacrylate, N,N-diethylaminoethyl methacrylate, t-butylaminoethyl methacrylate, 2-sulfoethyl methacrylate, trifluoroethyl methacrylate, glycidyl methacrylate, benzyl methacrylate, allyl methacrylate, 2-n-butoxyethyl methacrylate, 2-chloroethyl methacrylate, sec-butyl-methacrylate, tert-butyl methacrylate, 2-ethybutyl methacrylate, cinnamyl methacrylate, crotyl methacrylate, cyclohexyl methacrylate, cyclopentyl methacrylate, 2-ethoxyethyl methacrylate, furfuryl methacrylate, hexafluoroisopropyl methacrylate, methallyl methacrylate, 3-methoxybutyl methacrylate, 2-methoxybutyl methacrylate, 2-nitro-2 methylpropyl methacrylate, n-octyl-methacrylate, 2-ethylhexyl methacrylate, 2-phenoxyethyl methacrylate, 2-phenylethyl methacrylate, phenyl methacrylate, propargyl methacrylate, tetrahydrofurfuryl methacrylate and tetrahydropyranyl methacrylate.

Typical acrylic esters suitable for use in the resin addition polymerization reaction include methyl acrylate, ethyl acrylate, n-propyl acrylate, isopropyl acrylate, n-butyl acrylate, n-decyl acrylate, 2-ethylhexal acrylate, and the like.

Typical methacrylic acid derivative acrylic monomers suitable for use in the resin addition polymerization reaction include methacrylic acid derivatives such as: methacrylic acid salts, methacrylonitrile, methacrylamide, N-methylmethacrylamide, N-ethylmethacrylamide, N,N-diethymethacrylamide, N,N-dimethylmethacrylamide, N-phenyl-methacrylamide, methacrolein, and the like.

Acrylic acid derivatives suitable for use in the resin addition polymerization reaction include: acrylic acid salts, acrylonitrile, acrylamide, methyl alpha-chloroacrylate, methyl 2-cyanoacrylate, N-ethylacrylamide, N,N-diethylacrylamide acrolein, and the like.

Typical ethylenic monomers suitable for use in the resin addition polymerization reaction include vinyl acetate, derivatives of vinyl acetate, vinyl chloride, derivatives of vinyl chloride, vinyl pyridine, vinyl pyrollidone, sodium crotonate, methyl crotonate, crotonic acid, and the like.

From about 10.0% to about 95.0% by total weight of the mixture employed in the emulsion polymerization reaction of the present invention consists of at least one member selected from the group consisting of vinylic monomers and combinations thereof, with the preferred amount being in the range of about 20.0% to about 50.0% by total weight of the emulsion polymerization reactants.

Vinylic monomers which are suitable for use in the emulsion polymerization reaction of the present invention include styrenic monomers, acrylic monomers, methacrylic monomers, ethylenic monomers, and the like. In the emulsion polymerization reaction, it is preferred that the vinylic monomers be a mixture, preferably including at least one monoalkenyl aromatic monomer and at least one acrylic monomer. Examples of suitable monoalkenyl aromatic monomers include, but are not limited to, the following: alpha-methyl styrene, styrene, vinyl toluene, tertiary butyl styrene, ortho-chlorostyrene, and mixtures thereof.

The term "acrylic monomer" as employed herein in reference to the vinylic monomers employed in the emulsion polymerization reaction includes members of the group consisting of acrylic acid, methacrylic acid, acrylic acid esters, methacrylic acid esters, derivatives of acrylic acid, derivatives of methacrylic acid, and combinations thereof. Examples of acrylic and methacrylic ester monomers suitable for use in the emulsion polymerization reaction include the $C_1$-$C_{30}$ alkyl ester derivatives. Methacrylic esters suitable for use in the emulsion polymerization reaction include, but are not limited to, the following: methyl methacrylate, ethyl methacrylate, n-propyl methacrylate, n-butyl methacrylate, isopropyl methacrylate, isobutyl methacrylate, n-amyl methacrylate, n-hexyl methacrylate, isoamyl methacrylate, 2-hydroxyethyl methacrylate, 2-hydroxypropyl methacrylate, N,N-dimethylaminoethyl methacrylate, N,N-diethylaminoethyl methacrylate, t-butylaminoethyl methacrylate, 2-sulfoethyl methacrylate, trifluoroethyl methacrylate, glycidyl methacrylate, benzyl methacrylate, allyl methacrylate, 2-n-butoxyethyl methacrylate, 2-chloroethyl methacrylate, sec-butyl-methacrylate, tert-butyl methacrylate, 2-ethybutyl methacrylate, cinnamyl methacrylate, crotyl methacrylate, cyclohexyl methacrylate, cyclopentyl methacrylate, 2-ethoxyethyl methacrylate, furfuryl methacrylate, hexafluoroisopropyl methacrylate, methallyl methacrylate, 3-methoxybutyl methacrylate, 2-methoxybutyl methacrylate, 2-nitro-2 methylpropyl methacrylate, n-octyl-methacrylate, 2-ethylhexyl methacrylate, 2-phenoxyethyl methacrylate, 2-phenylethyl methacrylate, phenyl methacrylate, propargyl methacrylate, tetrahydrofurfuryl methacrylate and tetrahydropyranyl methacrylate.

Typical acrylic esters suitable for use in the emulsion polymerization reaction include methyl acrylate, ethyl acrylate, n-propyl acrylate, isopropyl acrylate, n-butyl acrylate, n-decyl acrylate, 2-ethylhexal acrylate, and the like.

Typical methacrylic acid derivative acrylic monomers suitable for use in the emulsion polymerization reaction include methacrylic acid derivatives such as: methacrylic acid and its salts, methacrylonitrile, methacrylamide, N-methylmethacrylamide, N-ethylmethacrylamide, N,N-diethymethacrylamide, N,N-dimethylmethacrylamide, N-phenyl-methacrylamide, methacrolein, and the like.

Acrylic acid derivatives suitable for use in the emulsion polymerization reaction as the acrylic monomer include: acrylic acid and its salts, acrylonitrile, acrylamide, methyl alpha-chloroacrylate, methyl 2-cyanoacrylate, N-ethylacrylamide, N,N-diethylacrylamide acrolein, and the like.

Typical ethylenic monomers suitable for use in the emulsion polymerization reaction include vinyl acetate, derivatives of vinyl acetate, vinyl chloride, derivatives of vinyl chloride, vinyl pyridine, vinyl pyrollidone, sodium crotonate, methyl crotonate, crotonic acid, and the like.

A catalytic amount of polymerization initiator (or combination of polymerization initiators) is employed in both the resin addition polymerization reaction and the emulsion polymerization reaction. In the resin addition polymerization reaction, it is preferred that from about 0.5% to about 5.0% by total weight of the monomer mixture be polymerization initiator, with the more preferred range being from about 1.0% to about 3.0% by total weight of the monomer mixture. Polymerization initiators which are suitable for use in the resin addition polymerization reaction include, but are not limited to, the following: t-butyl peroxide, t-butyl peroxybenzoate, t-butyl peroctoate, cumene hydroperoxide, azobisisobutyronitrile, benzoyl peroxide, and combinations thereof.

In the emulsion polymerization reaction, it is preferred that from about 0.5% to about 4.0% by total weight of the mixture be polymerization initiator, with the more preferred range being from about 0.5% to about 2.0% by total weight of the reactant mixture. The type of polymerization initiator suitable is known in the art to depend upon the desired temperature for the reaction. Suitable initiators include thermal initiators, redox initiators, and combinations thereof. Thermal initiators which are suitable for use include, but are not limited to, the following: hydrogen peroxide, t-butyl hydroperoxide, di-t-butyl peroxide, benzoyl peroxide, benzoyl hydroperoxide, 2,4-dichlorobenzoyl peroxide, t-butyl peracetate, azobisisobutyronitrile, ammonium persulfate, sodium persulfate, potassium persulfate, isopropyl peroxycarbonate, cumene hydroperoxide, and combinations thereof. Suitable redox initiators include, but are not limited the following: sodium persulfate-sodium formaldehyde sulfoxylate, cumene hydroperoxide-sodium metabisulfite, potassium persulfate-sodium metabisulfite, potassium persulfate-sodium bisulfite, cumene hydroperoxide-iron (II) sulfate, and combinations thereof.

Where desired to adjust the molecular weight of the reaction product, a chain transfer agent (or combination of chain transfer agents) may be employed in the resin addition polymerization reaction, the emulsion polymerization reaction, or both the resin addition and the emulsion polymerization reactions. Chain transfer agents which are suitable for use in the present invention include, but are not limited to, the following: dodecyl mercaptan, mercaptoacetic acid, mercaptopropionic acid, octyl mercaptan, 2-mercaptoethanol, and combinations thereof. While up to about 4.0% by total weight of the monomer mixture and/or the emulsion polymerization reaction mixture may be a chain transfer agent; where employed it is preferred to use an amount in the range of from about 0.5% to about 2.0% by total weight of the respective mixture.

Where desired, a hydrocarbon solvent (or combination of hydrocarbon solvents) may be employed in the resin addition polymerization reaction. Suitable hydrocarbon solvents include aromatic solvents, aliphatic solvents, and combinations thereof. While up to about 30.0% by total weight of the monomer mixture may be a hydrocarbon solvent; where employed it is preferred to use an amount in the range of up to about 4.0% by total weight of the mixture.

Where desired, a surfactant (or combination of surfactants) may be employed in the emulsion polymerization reaction in an amount up to about 4.0% by weight of the reaction mixture. Surfactants that are suitable for use in the present invention include members selected from the group consisting of anionic surfactants, non-ionic surfactants, and combinations thereof. Suitable anionic surfactants include alkyl sulfates, ether sulfates, phosphate esters, sulfonates, and the like. Suitable non-ionic surfactants include alcohol ethoxylates, alkylphenol ethoxylate, phenol ethoxylate, block copolymers, and the like. Anionic and non-ionic surfactants containing polymerizable groups (known in the art as "polymerizable surfactants") are also suitable for use in the present invention.

The resin addition polymerization reaction used to produce the rosin-fatty acid ester vinylic polymer compositions is a melt polymerization reaction in which no water is employed. Reaction temperatures suitable for use in the resin addition polymerization reactions of the present invention are within the range of about 135° C. to about 200° C.; with the preferred temperatures being in the range of about 140° C. to about 190° C.

The rosin and alkyl ester of unsaturated fatty acid function as solvents in the resin addition polymerization reaction of the acrylic monomers. Additionally, while a portion of the fatty acid ester and the rosin component remains unreacted, some of the fatty acid ester and rosin becomes graft polymerized onto the acrylic. The resulting rosin-fatty acid ester vinylic polymer compositions have a weight average molecular weight in the range of about 4,000 to about 12,000, with the preferred molecular weights being in the range of about 5,000 to about 11,000.

Rosin-fatty acid ester vinylic polymer compositions which are suitable for use as support resins for industrial coatings, ink and overprint applications have an acid number in the range of about 160 to about 500; with the preferred range being about 190 to about 260. However, the acid number range will vary depending upon the respective application of the rosin-fatty acid ester vinylic polymer compositions. For example, when aqueous dispersions of the rosin-alkyl ester vinylic polymer compositions are employed as surface sizing compositions for cellulosic materials, a suitable acid number is in the range of about 50 to about 500; with the preferred range being about 50 to about 250. It is well within the ability of one skilled in the art to determine proper acid number ranges for various applications.

It is preferred to employ a bulk polymerization process for the resin addition polymerization reaction. The residence time for such bulk processes is commonly in the range of about 3 hours to about 10 hours. However, where desired the resin addition polymerization reaction may be conducted via the use of a continuous stirred polymerization process. The residence time for such continuous processes is commonly in the range of about 90 minutes to about 6 hours; with the preferred residence time being in the range of about 2 hours to about 4 hours.

An emulsion polymerization reaction is employed to produce the rosin-fatty acid ester vinylic polymer emulsion compositions. Reaction temperatures suitable for use in the emulsion polymerization reaction of the present invention are within the range of about 20° C. to less than 100° C.; with the preferred temperatures being in the range of about 60° C. to about 85° C. The resulting rosin-alkyl ester of unsaturated fatty acid vinylic emulsion compositions have a weight average molecular weight in the range of about 40,000 to about 200,000; with the preferred molecular weights being in the range of about 40,000 to about 180,000.

It is well within the ability of one skilled in the art to produce an aqueous base suitable for use in dissolving the rosin-fatty acid ester vinylic polymer emulsion compositions to produce support resins. Such aqueous bases include those produced using organic solvents and various inorganic solvents (such as sodium hydroxide, potassium hydroxide, ammonium hydroxide, amines, sulfates, and the like).

The rosin-fatty acid ester vinylic polymer compositions and the rosin-fatty acid ester vinylic polymer emulsion compositions of the present invention are hybrid compositions containing a solventborne rosin-fatty acid ester component and a waterborne acrylic component on the same molecule. This unique combination gives the rosin-fatty acid ester vinylic polymer compositions and the rosin-fatty acid ester vinylic polymer emulsion compositions properties of both solventborne polymers and waterborne polymers. For example, the emulsion compositions have characteristics which permit the formulation of coatings exhibiting ultra-high gloss, excellent lay and hold-out properties, superior water and chemical resistances with sufficient crosslinking structures, compatibility with highly pigmented systems, and resolubility. Additionally, the emulsion compositions further exhibit enhanced flow and leveling characteristics, package stabilities, exceptional stain resistance and stain removal, and excellent wet and dry adhesion to multiple substrates. These properties allow the emulsion compositions to function as superior binders in clear and pigmented paints for architectural, industrial, and maintenance coatings applications on metal, plastic, alkyd and wood substrates. When employed for coatings applications, the emulsion compositions allow an enhanced waterborne application having performances normally associated only with solventborne alkyd binders. Indeed, the emulsion compositions have proven to be superior to many solventborne alkyds in both gloss and color stability.

Due to increasing environmental concerns, industry has concentrated intensive efforts in the area of waterborne alkyds. However, the use of waterborne alkyds in the coatings market has heretofore been limited because of the higher production costs and lower gloss characteristics associated with traditional waterborne alkyds when compared to solventborne alkyds. Moreover, existing waterborne alkyds often suffer from hydrolytic instability (which can result in poor package stability and performance consistency). As the emulsion compositions of the present invention are hybrids of rosin-fatty acid ester and acrylic technologies, the compositions exhibit acrylic characteristics of hydrolytic stability, color and gloss stability. At the same time, the emulsion compositions also exhibit rosin-fatty acid ester characters of flexibility and elasticity—which allow the emulsions to function as excellent waterborne ink vehicles and coatings binders.

To produce the rosin-fatty acid ester vinylic polymer emulsion compositions of the present invention, the vinylic monomers are copolymerized in an aqueous medium with the rosin-fatty acid ester vinylic polymer component of the mixture along with polymerization initiator and, if desired, surfactant. Where desired, chain transfer agent can be included to control the molecular weight of the emulsion composition. The solids level of the rosin-fatty acid ester vinylic emulsion compositions is commonly in the range of about 30.0% to about 70.0%, with the preferred solids level being in the range of about 40.0% to about 55.0%. It is well within the ability of one skilled in the art to utilize the teachings contained herein to produce appropriate solids level for a desired application.

Where desired, the rosin-fatty acid ester vinylic polymer emulsion compositions of the present invention may be utilized to produce aqueous paints, pigmented aqueous paints, aqueous overprint varnishes, and pigmented aqueous inks. It is well within the ability of one skilled in the art to utilize the teachings contained herein to produce desired paints, varnishes and inks for specific applications.

The rosin-fatty acid ester vinylic polymer compositions have characteristics which differ from the traditional melt blends of flake acrylic fatty acid rosin. For example, the low molecular weights of the rosin-fatty acid ester vinylic polymer compositions enable these polymers to be neutralized at high solid levels while maintaining low viscosities. The low molecular weight coupled with the polymer's high levels of functional carboxyl units permits the production of support resins which contain high amounts of functional polymer components while maintaining targeted viscosity levels for industrial coating and ink formulation purposes. The rosin-fatty acid ester vinylic polymer emulsion compositions are well-suited for use in industrial coatings, inks, overprints, and other coating applications as these emulsion compositions tend to improve both the gloss and the leveling properties of the industrial coating and formulated inks.

As appreciated in the art, the exact components and properties of components desired for any coating application can vary and, therefore, routine experimentation may be required to determine the optional components and proportions of components for a given application and desired properties.

The following examples are provided to further illustrate the present invention and are not to be construed as limiting the invention in any manner.

EXAMPLE 1

A rosin-alkyl ester of unsaturated fatty acid vinylic polymer composition was prepared via the following method. A reactor vessel equipped with a thermometer, stirrer, monomer feed pump, and a blanket nitrogen intake line was charged at room temperature with a mixture of 365.0 g of FE-100 (a tall oil fatty acid butyl ester composition commercially available from MeadWestvaco Corporation) and 142.0 g of Rosin SS (a tall oil rosin composition commercially available from MeadWestvaco Corporation). The mixture was heated under a nitrogen blanket to 175° C. and held at that temperature, whereupon Charge A was added, with stirring, over a five-hour period. Charge A consisted of a mixture of 280.0 g of styrene, 280.0 g of alpha-methyl styrene, 415.0 g of acrylic acid, and 12.0 g of di-tert-butyl peroxide. After the addition of Charge A was completed, the reaction mixture was held at 175° C. for an additional hour. At that time 2.2 g of di-tert-butyl peroxide was added and the reaction mixture was held at 175° C. for an additional hour. The resulting rosin-fatty acid ester vinylic polymer composition (hereafter referred to as "Polymer No. 1") was allowed to cool prior to being evaluated (see Table I below).

EXAMPLE 2

A rosin-fatty acid ester vinylic emulsion composition was prepared via the following method. A round bottom or cylindrical flask was equipped with stirrer, thermometer, nitrogen port, and reflux condenser. To the flask was added 228.0 g of Polymer No. 1, 50.0 g of ammonium hydroxide, and 940.0 g of deionized water, and the mixture was heated to 85° C. Additional ammonium hydroxide was added to adjust the pH of the solution to a range of around 8.0-8.5 to produce a support resin composition. An initiator solution composed of 2.3 g of ammonium persulfate and 13.0 g of deionized water was charged to the flask. Immediately after the addition of the initiator solution, 22.0 g of styrene and 15.0 g of butyl acrylate were added to the flask. Thirty minutes after this addition, a second monomer mixture (composed of 375.0 g of styrene and 245.0 g of butyl acrylate) and a second initiator solution (composed of 8.0 g of ammonium persulfate and 115.0 g of deionized water) were charged concurrently into the reaction over a period of 120 minutes. Upon completion of the feeds, the reaction was held at temperature for 60 minutes and then cooled to room temperature and filtered. The resulting rosin-fatty acid ester vinylic emulsion composition (hereinafter referred to as "Emulsion No. 1") contained 42% solids and had a pH of 8.2.

EXAMPLE 3

A rosin-alkyl ester of unsaturated fatty acid vinylic polymer composition was prepared via the following method. A reactor vessel equipped with a thermometer, stirrer, monomer feed pump, a blanket nitrogen intake line was charged at room temperature with a mixture of 270.0 g of FE-100 (a tall oil fatty acid butyl ester composition commercially available from MeadWestvaco Corporation) and 105.0 g of Rosin SS (a tall oil rosin composition commercially available from MeadWestvaco Corporation). The mixture was heated under a nitrogen blanket to 176° C. and held at that temperature, whereupon Charge A was added with stirring, over a five hour period. Charge A consisted of a mixture of 340 g of styrene, 340 g of alpha-methyl styrene, 420 g of acrylic acid, and 16 g of di-tert-butyl peroxide. After the addition of Charge A was completed, the reaction mixture was held at 176° C. for an additional hour. After the hold, 2.2 g of di-tert-butyl peroxide was added and the reaction mixture was held at 176° C. for an additional hour. The resulting rosin-fatty acid ester vinylic polymer (hereafter referred to as "Polymer No. 2") was allowed to cool prior to being evaluated (see Table I below).

A support resin composition was prepared by mixing 228.0 g of Polymer No. 2, 50.0 g of ammonium hydroxide, and 940.0 g of deionized water in a reactor.

EXAMPLE 4

A rosin-alkyl ester of unsaturated fatty acid vinylic polymer composition was prepared via the following method. A reactor vessel equipped with a thermometer, stirrer, monomer feed pump, a blanket nitrogen intake line was charged at room temperature with a mixture of 365.0 g of FE-100 (a tall oil fatty acid butyl ester composition commercially available from MeadWestvaco Corporation) and 142.0 g of Rosin SS (a tall oil rosin composition commercially available from MeadWestvaco Corporation). The mixture was heated under a nitrogen blanket to 188° C. and held at that temperature, whereupon Charge A was added with stirring over a five hour period. Charge A consisted of a mixture of 335.0 g of styrene, 335.0 g of alpha-methyl styrene, 300.0 g of acrylic acid, and 19.0 g of di-tert-butyl peroxide. After the addition of Charge A was completed, the reaction mixture was held at 188° C. for an additional hour. At that time, 2.2 g of di-tert-butyl peroxide was added and the reaction mixture was held at 188° C. for an additional hour. The resulting rosin-fatty acid ester vinylic polymer (hereafter referred to as "Polymer No. 3") was allowed to cool prior to being evaluated (see Table I below).

A support resin composition was prepared by mixing 228.0 g of Polymer No. 3, 40.0 g of ammonium hydroxide, and 940.0 g of deionized water in a reactor.

TABLE I

RESIN PROPERTIES

PROPERTIES

| Resin | MW[1] | Acid No. | Softening Pt (° C.) |
|---|---|---|---|
| Polymer 1 | 6,700 | 220 | 104 |
| Polymer 2 | 6,000 | 215 | 125 |
| Polymer 3 | 4,000 | 165 | 91 |
| H-2720[2] | 6500 | 209 | 109 |
| H-2702[3] | 7,000 | 206 | 140 |
| H-2701[3] | 2,500 | 210 | 135 |
| H-2702[3] | 7,000 | 206 | 155 |
| M-101[4] | 7,000 | 204 | 134 |
| J-678[5] | 8,400 | 205 | 145 |
| J-682[5] | 1,500 | 243 | 105 |
| J-690[5] | 16,000 | 240 | 136 |
| C-1162[6] | 2,300 | 216 | 125 |

[1]Weight Average Molecular Weight.
[2]HYATOP H-2720 is an acrylic tall oil hybrid resin commercially available from MeadWestvaco Corporation.
[3]JONREZ H-2702 and H-2701 are acrylic resins commercially available from MeadWestvaco Corporation.
[4]MOREZ M-101 is an acrylic resin commercially available from Morton International Inc.
[5]JONCRYL J-678, J-682, and J-690 are acrylic resins commercially available from S. C. Johnson and Son, Inc.
[6]CARBOSET C-1162 is an acrylic resin commercially available from B. F. Goodrich.

As shown by the data in Table I, the rosin-fatty acid ester vinylic polymer resins can be tailored to have chemical characteristics and properties similar to commercially available, commonly employed resins.

EXAMPLE 5

An interior gloss paint incorporating the rosin-fatty acid ester vinylic emulsion composition of Example 2 ("Emulsion No. 1") was prepared at pigment volume concentration (PVC) of 15.9%, and volume solid of 37.8% as shown in Table II below. For comparison purposes, interior gloss paints were also made using the procedure described in Example 2 wherein Polymer No. 1 was replaced with HYATOP H-2720 (a rosin-fatty acid vinylic polymer commercially available from MeadWestvaco Corporation) at two different concentrations as shown in Table III below.

TABLE II

INTERIOR GLOSS PAINT CONTAINING ROSIN-FATTY ACID ESTER VINYLIC EMULSION COMPOSITION

|  | Pounds | Gallons |
|---|---|---|
| GRIND |  |  |
| Water | 83.3 | 10.00 |
| Propylene glycol | 8.0 | 0.93 |
| NATROSOL 330PA[1] | 2.0 | 0.17 |
| Ammonium hydroxide, 28% | 2.0 | 0.27 |
| TAMOL 681[2] | 6.6 | 0.73 |
| IGEPAL CTA 639W[3] | 2.2 | 0.25 |
| BYK 028[4] | 1.0 | 0.11 |
| TEGO Airex 902W[5] | 4.0 | 0.48 |
| Dupont R-706[6] | 200.0 | 6.00 |
| DISPERSE |  |  |
| Water | 40.0 | 4.85 |
| Ammonium hydroxide, 28% | 2.0 | 0.27 |
| SANTICIZER 160[7] | 7.0 | 0.75 |
| BYK 028 | 1.0 | 0.11 |
| Emulsion No. 1 | 585.0 | 66.48 |
| Water | 27.7 | 3.32 |
| Dow DPnB[8] | 16.0 | 2.12 |
| VELATE 368[9] | 4.0 | 0.51 |
| SURFYNOL 440[10] | 3.0 | 0.38 |
| ACRYSOL RM-2020NPR[11] | 4.0 | 0.47 |
| ACRYSOL RM-8W[12] | 16.1 | 1.85 |
| Total Weight | 1014.9 | 100.05 |

[1]NATROSOL 330PA is a modified hydroxyethylcellulose commercially available from Hercules Inc.
[2]TAMOL 681 is a polymeric dispersion commercially available from Rohm and Haas Co.
[3]IGEPAL CTA 639W is a modified alkylphenol ethoxylate surfactant commercially available from Rhodia.
[4]BYK 028 is a silicone-based defoamer commercially available from BYK-Chemie USA.
[5]TEGO AIREX 902W is an emulsion of polyether-siloxane commercially available from Golfschmidt Chemical Corp.
[6]DuPont R-706 is a rutile titanium dioxide pigment commercially available from DuPont Company.
[7]SANTICIZER 160 is 1,2-benzenedicarboxylic acid, butyl phenylmethyl ester, o-phthalic acid, n-butylbenzyl ester commercially available from Solutia Inc.
[8]Dow DPnB is dipropylene glycol n-butyl ether commercially available from Dow Chemical Co.
[9]VELATE 368 is benzoate ester commercially available from Velsicol Chemical Corp.
[10]SURFYNOL 440 is a non ionic surfactant commercially available from Air Products and Chemicals Inc.
[11]ACRYSOL RM-2020 NPR is a rheology modifier commercially available from Rohm and Haas Comp.
[12]ACRYSOL RM-8W is a rheology modifier commercially available from Rohm and Haas Comp.

TABLE III

INTERIOR GLOSS PAINT CONTAINING ROSIN-FATTY ACID VINYLIC EMULSION COMPOSITION

|  | Pounds | Gallons |
|---|---|---|
| GRIND |  |  |
| Water | 52.4 | 6.29 |
| Propylene glycol | 17.3 | 2.00 |
| TAMOL 165A[1] | 11.1 | 1.25 |
| IGEPAL CTA 639W[2] | 2.2 | 0.25 |
| Ammonium hydroxide, 28% | 1.9 | 0.25 |
| BYK 022[3] | 1.0 | 0.12 |
| ACRYSOL RM-825[4] | 4.4 | 0.50 |
| DuPont R-706[5] | 200.0 | 6.00 |
| Water | 25.0 | 3.00 |
| DISPERSE |  |  |
| Water | 48.5 | 5.88 |

TABLE III-continued

INTERIOR GLOSS PAINT CONTAINING ROSIN-FATTY ACID VINYLIC EMULSION COMPOSITION

|  | Pounds | Gallons |
|---|---|---|
| Emulsion made with H-2720[6] | 567.3 | 65.21 |
| NUOCURE CK-10[7] | 8.1 | 1.00 |
| Colloid 645[8] | 1.9 | 0.25 |
| SANTICIZER 160[9] | 9.3 | 1.00 |
| Dow DB[10] | 15.9 | 2.00 |
| Dow DPnB[11] | 30.2 | 4.00 |
| ACRYSOL RM-825 | 8.7 | 1.00 |
| Total Weight | 1005.6 | 100.0 |

[1]TAMOL 165A is a polymeric dispersion commercially available from Rohm and Haas Co.
[2]IGEPAL CTA 639W is a modified alkylphenol ethoxylate surfactant commercially available from Rhodia.
[3]BYK 022 is a silicone-based defoamer commercially available from BYK-Chemie USA.
[4]ACRYSOL RM-825 is an acrylic thickener polymer commercially available from Rohm and Haas Co.
[5]DuPont R-706 is a rutile titanium dioxide pigment commercially available from DuPont Company.
[6]HYATOP H-2720 (a rosin-fatty acid vinylic polymer commercially available from MeadWestvaco Corporation)
[7]NUOCURE CK-10 is a water-dispersible drier commercially available from Condea Servo.
[8]Colliod 645 is an oil-based defoamer commercially available from Rhodia.
[9]SANTICIZER 160 is 1,2-benzenedicarboxylic acid, butyl phenylmethyl ester, o-phthalic acid, n-butylbenzyl ester commercially available from Solutia Inc.
[10]Dow DB is butyl carbotil commercially available from Dow Chemical Co.
[11]Dow DPnB is dipropylene glycol n-butyl ether commercially available from Dow Chemical Co.

Tests showed that the paints made with Emulsion No. 1 exhibited superior dry and wet adhesion, increased chemical resistance, and superior scrub resistant properties (particularly on various metal surfaces) when compared to the paints formulated with the emulsions made with the rosin-fatty acid vinylic polymer.

Many modifications and variations of the present invention will be apparent to one of ordinary skill in the art in light of the above teachings. It is therefore understood that the scope of the invention is not to be limited by the foregoing description, but rather is to be defined by the claims appended hereto.

What is claimed is:

1. A rosin-fatty acid ester vinylic polymer composition comprising the reaction product produced by reacting in a resin addition polymerization reaction:
    (1) about 15.0% to about 60.0% by total weight of the reactants of a fatty acid ester rosin mixture comprising:
        (a) about 10.0% to about 90.0% by total weight of the fatty acid ester rosin mixture of at least one alkyl ester of unsaturated fatty acid, and
        (b) about 10.0% to about 90.0% by total weight of the fatty acid ester rosin mixture of rosin, and
    (2) about 40.0% to about 85.0% by total weight of the reactants of a monomer mixture comprising:
        (a) about 15.0% to about 55.0% by total weight of the monomer mixture of a member selected from the group consisting of acrylic acid, methacrylic acid, fumaric acid, maleic anhydride, and combinations thereof,
        (b) about 45.0% to about 85.0% by total weight of the monomer mixture of a member selected from the group consisting of non-carboxylic acid containing vinylic monomers and combinations thereof,
    (c) a catalytic amount of polymerization initiator,
    (d) up to about 4.0% by total weight of the monomer mixture of chain transfer agent, and
    (e) up to about 30.0% by total weight of the monomer mixture of hydrocarbon solvent,
at a temperature in the range of about 135° C. to about 200° C. to produce a rosin-fatty acid ester vinylic polymer composition having a weight average molecular weight in the range of about 4,000 to about 12,000.

2. The polymer composition of claim 1 wherein the fatty acid of the alkyl ester of unsaturated fatty acid is a member selected from the group consisting of fatty acids containing from 12 to 24 carbon atoms and combinations thereof.

3. The polymer composition of claim 2 wherein the fatty acid of the alkyl ester of unsaturated fatty acid is a member selected from the group consisting of fatty acids containing from 16 to 20 carbon atoms and combinations thereof.

4. The polymer composition of claim 1 wherein the alcohol portion of the alkyl ester of unsaturated fatty acid contains from 1 to 8 carbon atoms.

5. The polymer composition of claim 4 wherein the alcohol portion of the alkyl ester of unsaturated fatty acid contains from 3 to 5 carbon atoms.

6. The polymer composition of claim 1 wherein the rosin is a member selected from the group consisting of tall oil rosin, wood rosin, gum rosin, and combinations thereof.

7. The polymer composition of claim 1 wherein the non-carboxylic acid containing vinylic monomer is a member selected from the group consisting of styrenic monomers, acrylic monomers, methacrylic monomers, and combinations thereof.

8. The polymer composition of claim 1 wherein the non-carboxylic acid containing vinylic monomer is a mixture containing at least one monoalkenyl aromatic monomer and at least one acrylic monomer.

9. The polymer composition of claim 8 wherein the monoalkenyl aromatic monomer is a: member selected from the group consisting of alpha-methyl styrene, styrene, vinyl toluene, tertiary butyl styrene, ortho-chlorostyrene, and combinations thereof.

10. The polymer composition of claim 1 wherein the polymerization initiator comprises from about 0.5% to about 5.0% of the total weight of the monomer mixture.

11. The polymer composition of claim 1 wherein the polymerization initiator comprises from about 0.5% to about 1.5% of the total weight of the monomer mixture.

12. The polymer composition of claim 1 wherein the polymerization initiator is a member selected from the group consisting of t-butyl peroxide, t-butyl peroxybenzoate, t-butyl peroctoate, cumene hydroperoxide, azobisisobutyronitrile, benzoyl peroxide, and combinations thereof.

13. The polymer composition of claim 1 wherein the chain transfer agent is a member selected from the group consisting of dodecyl mercaptan, mercaptoacetic acid, mercaptopropionic acid, octyl mercaptan, 2-mercaptoethanol, and combinations thereof.

14. The polymer composition of claim 1 wherein the chain transfer agent is a member selected from the group consisting of dodecyl mercaptan, mercaptoacetic acid, mercaptopropionic acid, octyl mercaptan, 2-mercaptoethanol, and combinations thereof.

15. The polymer composition of claim 1 wherein the hydrocarbon solvent is a member selected from the group consisting of aromatic solvents, aliphatic solvents, and combinations thereof.

16. The polymer composition of claim 1 wherein the resin addition polymerization reaction occurs at a temperature in the range of about 140° C. to about 190° C.

17. The polymer composition of claim 1 wherein said polymer composition has a weight average molecular weight in the range of about 5,000 to about 11,000.

18. A rosin-fatty acid ester vinylic polymer emulsion composition comprising the reaction product produced by:
(A) reacting in a resin addition polymerization reaction:
  (1) about 15.0% to about 60.0% by total weight of the reactants of a fatty acid ester rosin mixture comprising:
    (a) about 10.0% to about 90.0% by total weight of the fatty acid ester rosin mixture of at least one alkyl ester of unsaturated fatty acid, and
    (b) about 10.0% to about 90.0% by total weight of the fatty acid ester rosin mixture of rosin; and
  (2) about 40.0% to about 85.0% by total weight of the reactants of a monomer mixture comprising:
    (a) about 15.0% to about 55.0% by total weight of the monomer mixture of a member selected from the group consisting of acrylic acid, methacrylic acid, fumaric acid, maleic anhydride, and combinations thereof,
    (b) about 45.0% to about 85.0% by total weight of the monomer mixture of a member selected from the group consisting of non-carboxylic acid containing vinylic monomers and combinations thereof,
    (c) a catalytic amount of polymerization initiator,
    (d) up to about 4.0% by total weight of the monomer mixture of chain transfer agent, and
    (e) up to about 30.0% by total weight of the monomer mixture of hydrocarbon solvent,
  at a temperature in the range of about 135° C. to about 200° C. to produce rosin-fatty acid ester vinylic polymer having a weight average molecular weight in the range of about 4,000 to about 12,000; and
(B) further reacting in an emulsion polymerization reaction a mixture of:
  (1) about 5.0% to about 90.0% by total weight of the mixture of rosin-fatty acid ester vinylic polymer of step A,
  (2.) about 10.0% to about 95.0% by total weight of the mixture of a member selected from the group consisting of vinylic monomers and combinations thereof,
  (3) a catalytic amount of polymerization initiator,
  (4) up to about 4.0% by total weight of the mixture of chain transfer agent,
  (5) up to about 4.0% by total weight of the mixture of surfactant, and
  (6) the balance of the mixture being water,
  at a temperature in the range of about 20° C. to less than 100° C. to produce a rosin-fatty acid ester vinylic polymer emulsion composition having a weight average molecular weight in the range of about 40,000 to about 200,000.

19. The polymer emulsion composition of claim 18 wherein the fatty acid of the alkyl ester of unsaturated fatty acid is a member selected from the group consisting of fatty acids containing from 12 to 24 carbon atoms and combinations thereof.

20. The polymer emulsion composition of claim 19 wherein the fatty acid of the alkyl ester of unsaturated fatty acid is a member selected from the group consisting of fatty acids containing from 16 to 20 carbon atoms and combinations thereof.

21. The polymer emulsion composition of claim 18 wherein the alcohol portion of the alkyl ester of unsaturated fattyacid contains from 1 to 8 carbon atoms.

22. The polymer emulsion composition of claim 18 wherein the rosin is a member selected from the group consisting of tall oil rosin, wood rosin, gum rosin, and combinations thereof.

23. The polymer emulsion composition of claim 18 wherein the vinylic monomer is a member selected from the group consisting of styrenic monomers, acrylic monomers, methacrylic monomers, and combinations thereof.

24. The polymer composition of claim 18 wherein the vinylic monomer is a mixture containing at least one monoalkenyl aromatic monomer and at least one acrylic monomer.

25. The polymer composition of claim 18 wherein the polymerization initiator in the resin addition polymerization reaction comprises from about 0.5% to about 5.0% of the total weight of the monomer mixture.

26. The polymer composition of claim 18 wherein the polymerization initiator in the resin addition polymerization reaction comprises from about 0.5% to about 1.5% of the total weight of the monomer mixture.

27. The polymer composition of claim 18 wherein the polymerization initiator in the resin addition polymerization reaction is a member selected from the group consisting of t-butyl peroxide, t-butyl peroxybenzoate, t-butyl peroctoate, cumene hydroperoxide, azobisisobutyronitrile, benzoyl peroxide, and combinations thereof.

28. The polymer emulsion composition of claim 18 wherein the polymerization initiator in the emulsion polymerization reaction comprises from about 0.5% to about 4.0% of the total weight of the reaction mixture.

29. The polymer emulsion composition of claim 18 wherein the polymerization initiator in the emulsion polymerization reaction comprises from about 0.5% to about 2.0% of the total weight of the reaction mixture.

30. The polymer emulsion composition of claim 18 wherein the polymerization initiator in the emulsion polymerization reaction is a member selected from the group consisting of thermal initiators, redox initiators, and combinations thereof.

31. The polymer emulsion composition of claim 30 wherein the thermal initiator is a member selected from the group consisting of hydrogen peroxide, t-butyl hydroperoxide, di-t-butyl peroxide, benzoyl peroxide, benzoyl hydroperoxide, 2,4-dichlorobenzoyl peroxide, t-butyl peracetate, azobisisobutyronitrile, ammonium persulfate, sodium persulfate, potassium persulfate, isopropyl peroxycarbonate, cumene hydroperoxide, and combinations thereof.

32. The polymer emulsion composition of claim 30 wherein the redox initiator is a member selected from the group consisting of sodium persulfate-sodium formaldehyde sulfoxylate, cumene hydroperoxide-sodium metabisulfite, potassium persulfate-sodium metabisulfite, potassium persulfate-sodium bisulfite, cumene hydroperoxide-iron (II) sulfate, and combinations thereof.

33. The polymer emulsion composition of claim 18 wherein the chain transfer agent is a member selected from the group consisting of dodecyl mercaptan, mercaptoacetic acid, mercaptopropionic acid, octyl mercaptan, 2-mercaptoethanol, and combinations thereof.

34. The polymer emulsion composition of claim 18 wherein the hydrocarbon solvent is a member selected from the group consisting of aromatic solvents, aliphatic solvents, and combinations thereof.

35. The polymer emulsion composition of claim 18 wherein the rosin-fatty acid ester vinylic polymer has a weight average molecular weight in the range of about 5,000 to about 11,000.

36. The polymer emulsion composition of claim 18 wherein the surfactant is a member selected from the group consisting of anionic surfactants, non-ionic surfactants, and combinations thereof.

37. The polymer emulsion composition of claim 18 wherein the emulsion polymerization reaction occurs at a temperature in the range of about 60° C. to about 85° C.

38. An aqueous paint comprising the polymer emulsion composition of claim 18.

39. The aqueous paint of claim 38 comprising the polymer emulsion composition of claim 20 and a pigment dispersion.

40. An aqueous overprint varnish comprising the polymer emulsion composition of claim 18.

41. An aqueous ink comprising the polymer emulsion composition of claim 18 and a pigment dispersion.

42. The polymer emulsion composition of claim 18 wherein the resin addition polymerization reaction occurs at a temperature in the range of about 140° C. to about 190° C.

* * * * *